(12) United States Patent
Peterson et al.

(10) Patent No.: US 9,521,811 B2
(45) Date of Patent: Dec. 20, 2016

(54) PLANT TOWER

(71) Applicant: Jack Steve Peterson, Knoxville, TN (US)

(72) Inventors: Jack Steve Peterson, Knoxville, TN (US); Ryan M. Peterson, Knoxville, TN (US)

(73) Assignee: Jack Steve Peterson, Knoxville, TN (US)

( * ) Notice: Subject to any disclaimer, the term of this patent is extended or adjusted under 35 U.S.C. 154(b) by 255 days.

(21) Appl. No.: 14/319,404

(22) Filed: Jun. 30, 2014

(65) Prior Publication Data

US 2015/0128494 A1    May 14, 2015

Related U.S. Application Data

(60) Provisional application No. 61/901,686, filed on Nov. 8, 2013.

(51) Int. Cl.
*A01G 9/02*  (2006.01)
*A01G 27/00* (2006.01)

(52) U.S. Cl.
CPC .............. *A01G 9/023* (2013.01); *A01G 27/005* (2013.01)

(58) Field of Classification Search
CPC .......... A01G 9/023; A01G 9/02; A01G 9/022; A01G 9/104; A01G 27/005; A01G 27/00; A01G 31/06
See application file for complete search history.

(56) References Cited

U.S. PATENT DOCUMENTS

| 2,713,752 | A | * | 7/1955 | Sobol | A01G 27/00 47/80 |
|---|---|---|---|---|---|
| 3,135,389 | A | | 6/1964 | Farley | |
| 3,252,252 | A | | 5/1966 | Muelberger, Jr. | |
| 3,841,023 | A | * | 10/1974 | Carlyon, Jr. | A01G 9/023 239/20 |

(Continued)

FOREIGN PATENT DOCUMENTS

| EP | 1825745 A2 | 8/2007 |
|---|---|---|
| EP | 2479352 A2 | 7/2012 |

(Continued)

OTHER PUBLICATIONS www.gardentowerproject.com, Garden Tower Project.
(Continued)

*Primary Examiner* — Lisa Tsang
*Assistant Examiner* — Magdalena Topolski
(74) *Attorney, Agent, or Firm* — Stephen J. Stark; Miller & Martin PLLC

(57) ABSTRACT

The stackable plant container module is adapted such that a plurality of plant container modules will nest together for storage and/or shipping while allowing the plant container modules to be stacked vertically into a multi-level plant tower. The stacked plant tower includes a water bowl, defining a reservoir for receiving water, carried by the upper most plant container module, and a water tray disposed between stacked plant container modules. The stacked plant tower is adapted such that the water bowl is in fluid communication with each water tray, such that the stacked plant tower incorporates structure for managing the flow of water through the stacked plant tower.

14 Claims, 9 Drawing Sheets

(56) References Cited

U.S. PATENT DOCUMENTS

| | | | |
|---|---|---|---|
| 4,216,617 A | 8/1980 | Schmidt | |
| 4,614,056 A | 9/1986 | Farkas | |
| 4,683,674 A * | 8/1987 | Faul | A01G 9/022 47/83 |
| 4,736,543 A * | 4/1988 | von Bertrab Erdmann | A01G 9/023 47/82 |
| 4,756,120 A * | 7/1988 | Arledge | A01G 31/06 47/59 R |
| 4,779,378 A | 10/1988 | Mason, Jr. | |
| 5,309,671 A | 5/1994 | Byun | |
| 5,438,797 A * | 8/1995 | Lendel | A01G 9/023 47/39 |
| 5,440,836 A * | 8/1995 | Lee | A01G 31/06 47/59 R |
| 5,481,826 A | 1/1996 | Dickinson et al. | |
| 5,918,415 A | 7/1999 | Locke et al. | |
| 6,125,579 A | 10/2000 | Pavelka | |
| 6,134,832 A | 10/2000 | Bokmiller et al. | |
| 6,442,895 B1 | 9/2002 | Van Roey | |
| 6,470,625 B1 | 10/2002 | Byun | |
| 6,612,073 B1 | 9/2003 | Powell et al. | |
| D493,384 S | 7/2004 | Jensen | |
| 6,840,008 B1 | 1/2005 | Bullock et al. | |
| 7,000,351 B2 * | 2/2006 | Baumann | A01G 27/04 47/32.7 |
| 7,043,877 B1 | 5/2006 | Jensen | |
| 7,055,282 B2 | 6/2006 | Bryan, III | |
| 7,690,151 B2 | 4/2010 | Wilkes | |
| D653,156 S | 1/2012 | Phelps et al. | |
| 8,191,310 B2 | 6/2012 | Keats | |
| 8,776,433 B2 | 7/2014 | Huang et al. | |
| 2008/0216403 A1 | 9/2008 | Schmidt et al. | |
| 2008/0236040 A1 | 10/2008 | Sheaffer et al. | |
| 2010/0146854 A1 | 6/2010 | Cannon et al. | |
| 2010/0229464 A1 | 9/2010 | Wilkes | |
| 2010/0287833 A1 * | 11/2010 | Keats | B65D 21/043 47/81 |
| 2010/0287834 A1 * | 11/2010 | Felknor | A01G 9/023 47/82 |
| 2012/0036771 A1 * | 2/2012 | Harshman | A01G 9/023 47/41.01 |
| 2012/0279126 A1 * | 11/2012 | Simmons | A01G 31/02 47/62 A |
| 2013/0145690 A1 * | 6/2013 | Cannon | A01G 9/023 47/66.7 |
| 2013/0213841 A1 | 8/2013 | Ward | |

FOREIGN PATENT DOCUMENTS

| | | |
|---|---|---|
| GB | 2477216 | 7/2011 |
| GB | 2488974 | 9/2012 |
| WO | WO2013/006174 | 1/2013 |
| WO | WO2013160889 A1 * | 10/2013 |

OTHER PUBLICATIONS

Sunleaves-Manufacturer www.sunleave.com,Tower Gro Tower Gro Pot Kit TGP200K.

www.MrStacky.com, Mr. Stacky Gardening products of fashionable design.

Exsco Manufacturer www.exaco.com,Exaco Trading EzGro Hydropnic Vertical Container Gardening System.

Patent Cooperation Treaty, International Search Report, Form PCT/ISA/220, Date of Mailing Jan. 14, 2015.

* cited by examiner

PLANT TOWER

CROSS-REFERENCE TO RELATED APPLICATIONS

The present application claims priority to Provisional Patent Application No. 61/901,686 filed on Nov. 8, 2013.

STATEMENT REGARDING FEDERALLY SPONSORED RESEARCH OR DEVELOPMENT

Not Applicable

BACKGROUND OF THE INVENTION

1. Field of Invention

The invention relates to an assembly of nestable container modules that assemble to form a plant tower having a water flow management system that incorporates a plurality of water trays defining diffusers for delivering water to the various modules in the tower. The individual container modules are configured so as to be nestable for storage and/or shipping.

2. Description of the Related Art

It is known in the art to have stackable planters that can also be nested in each other for storage or shipping. For example, U.S. Pat. No. 6,612,073, issued to Powell, et al on Sep. 2, 2003 discloses a molded plant growing container that is stacked in a vertical array. What is missing in the prior art is a nestable and stackable plant container module that includes an upper member defining a water reservoir for catching rain, or poured water, an inverted funnel, and a water tray having weep holes for managing the flow of water through the stacked plant tower.

BRIEF SUMMARY OF THE INVENTION

The stackable plant container module of the present invention is adapted such that a plurality of plant container modules will nest together for storage and/or shipping while allowing the plant container modules to be stacked vertically, providing a plurality of plant containers for receiving plant medium and plants thereby providing a vertically stacked plant tower. The plant container modules include an inverted funnel shaped member carried by the bottom wall and drainage holes disposed in the bottom wall. The inverted funnel shaped member cooperates with and is in fluid communication with a water tray defining a diffusing member. A water bowl that defines a reservoir for receiving a selected volume of water is in fluid communication with the inverted funnel members and the water trays such that the plant tower incorporates structure for managing the flow of water through the stacked tower.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
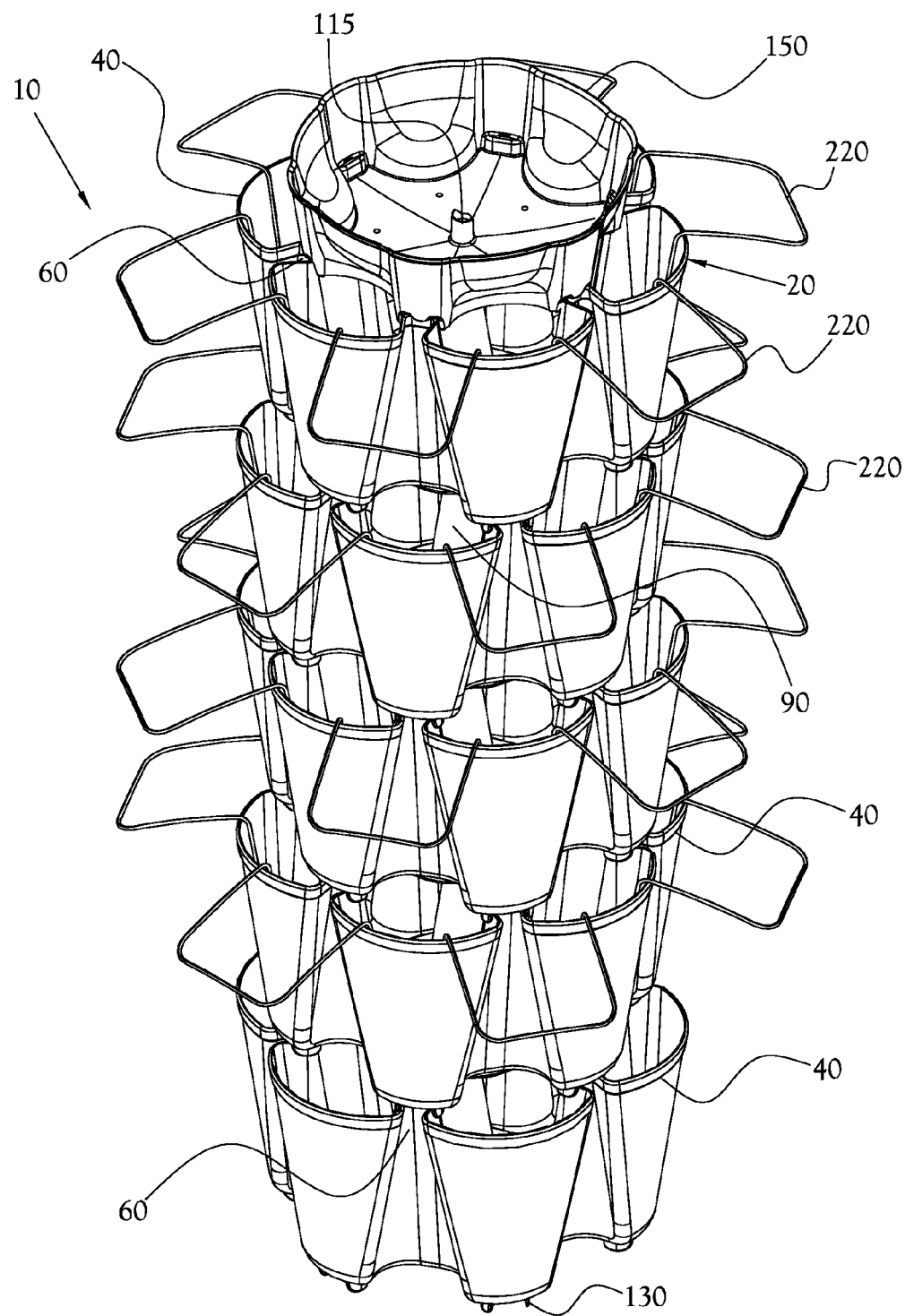
FIG. 1 is a perspective view of the stackable plant tower of the present invention for the plant tower of the present invention.
Figure 2:
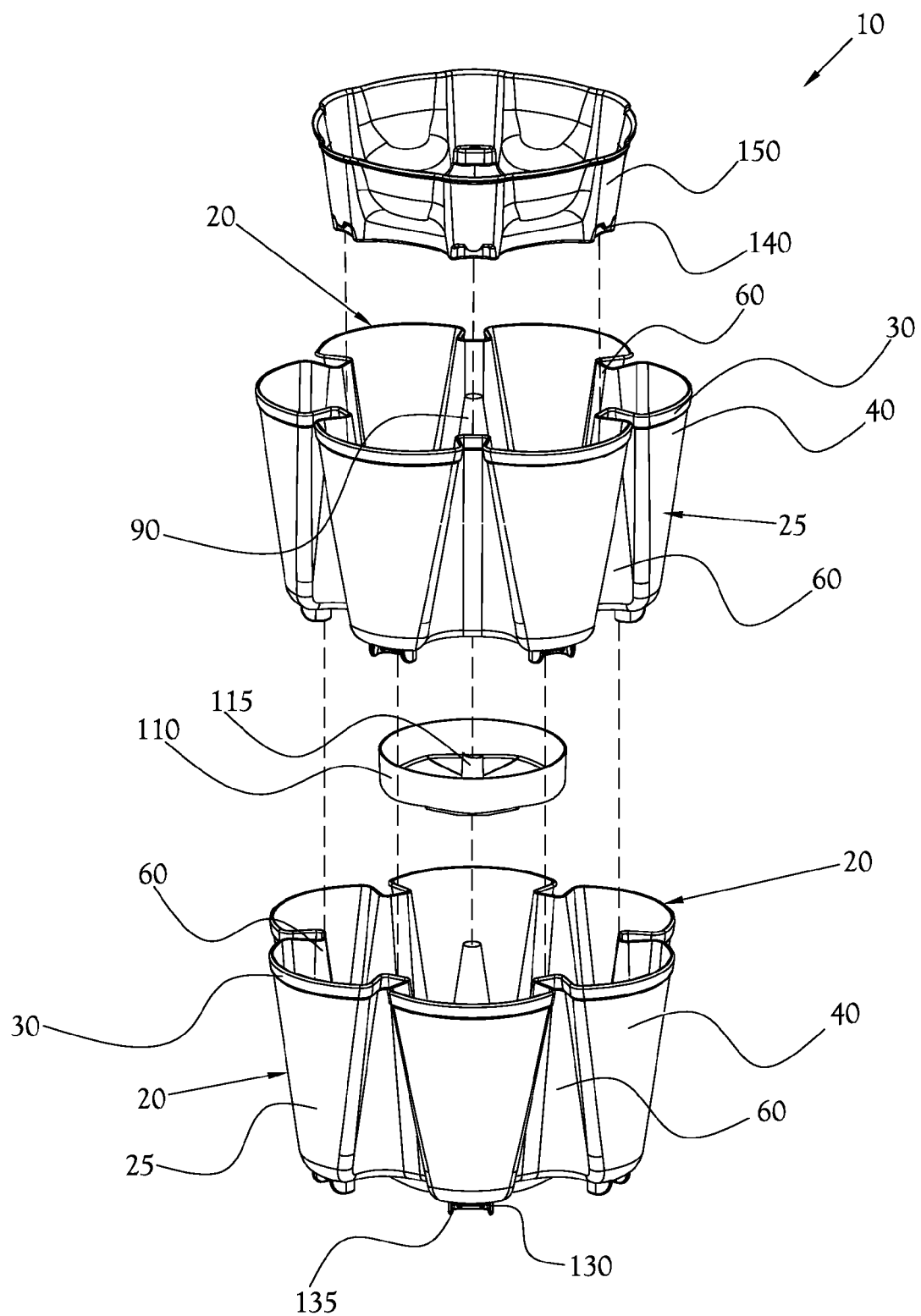
FIG. 2 is an exploded perspective view of the plant tower illustrated in FIG. 1 showing the spatial orientation of the water bowl, a plant container module, a water tray, and a second plant container module when stacked into the plant tower of the present invention.
Figure 3:
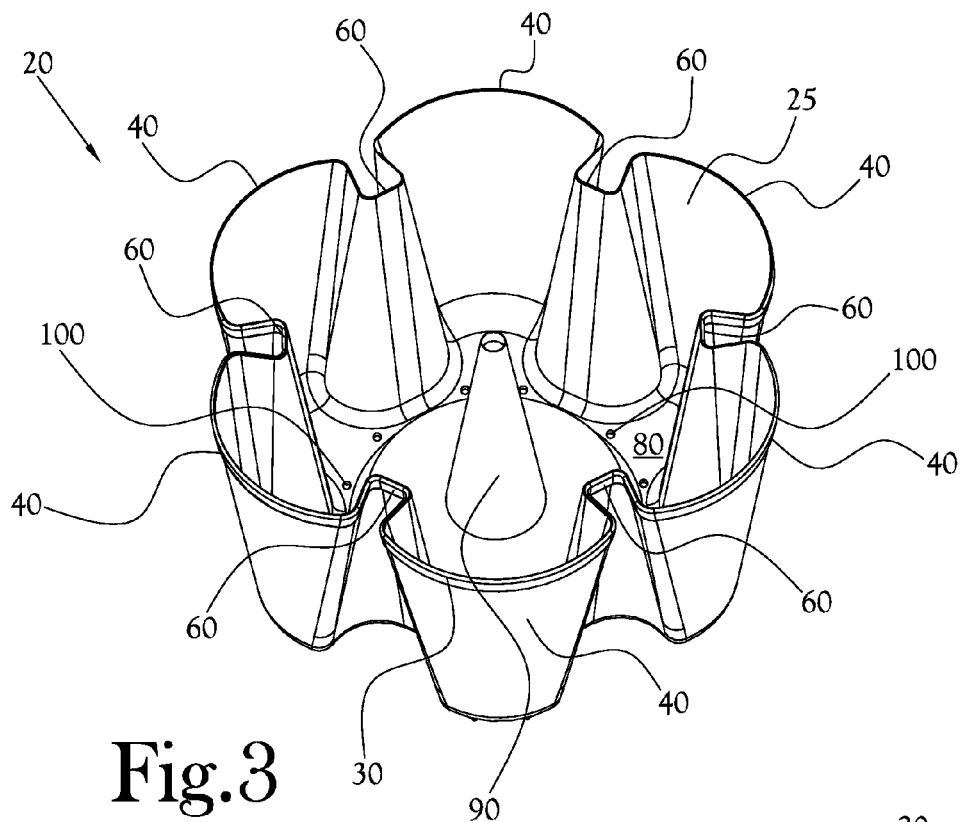
FIG. 3 is a perspective view of the plant container module of the plant tower illustrated in FIG. 1.
Figure 4:
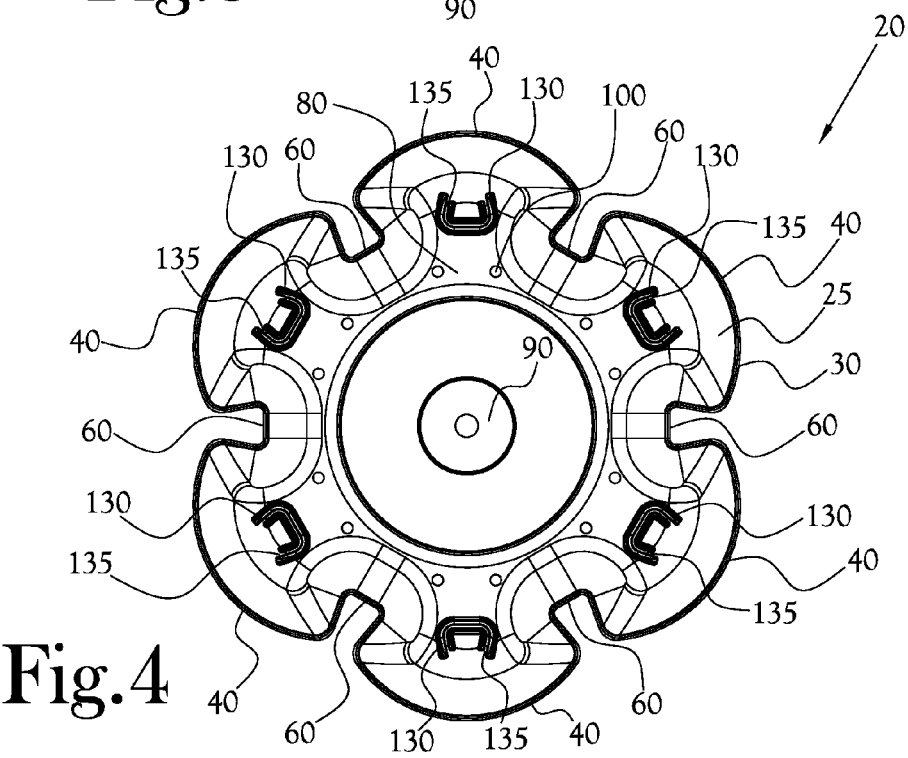
FIG. 4 is a bottom plan view of the plant container module illustrated in FIG. 3.

FIG. 1 illustrates a vertically stackable plant tower 10 constructed in accordance with the present invention. The stackable plant tower, in the preferred embodiment, comprises a plurality of plant container modules 20 which are adapted such that a plurality of plant container modules 20 can be nested together to save space for shipping and storage. Further, the plant container modules 20 are also adapted such that a plurality of plant container modules can be stacked together, thereby forming a stacked plant tower. While plant container modules can have any geometric shape, in the preferred embodiment, the plant container modules 20 are lobate. In addition to the stacked plant container modules 20, the vertically stacked plant tower 10 includes a water management assembly in cooperation with the stacked plant container modules 20 for directing a flow of water to each of the stacked plant container modules 20.

In this regard, each plant container module 20 includes an upwardly projecting wall member 25 having an upper rim 30. The upwardly projecting wall member 25 is configured with an array of alternating lobes 40 and indentations 60. It should be appreciated that the terms "lobe", "lobate" or "lobed" as used herein encompasses broad, rounded lobes, angular and/or substantially linear lobes, narrow flutes, or other similar shapes defined between indentations that can receive planting medium and plants. Further, while in the preferred embodiment, illustrated in FIGS. 1-11, the lobes are broader than the indentations, the present invention contemplates that the lobes could be narrower than the indentations, for example, as illustrated in FIG. 12, for reasons such as aesthetic appeal. Additionally, bent wire cage members 220 can be provided. Wire cage members 220 can be positioned at the edges of the lobes and can be used to support large plants, such as tomatoes. Additionally, wire cage members 220 can be used to support a plastic cover/tent (not shown), providing an air space between the plastic cover and the plant container modules 20 such that the stacked plant tower 10 becomes a stacked greenhouse. Alternatively, wire cage members 220 can support a mesh covering to protect the plants planted in stacked plant tower 10 from foraging animals.

Plant container module 20 also includes a bottom wall 80 upon which is provided an upwardly extending inverted funnel member 90. Bottom wall 80 is perforated by at least one drainage-hole member 100. Drainage-hole member 100 allows for drainage if the plant medium contained within plant container module 20 becomes saturated. However, as will be described in greater detail below, drainage-hole member is not the only means for managing water flow through the stacked plant tower 10. Disposed at the top of the plant tower 10 when assembled is, preferably, a water bowl 150 defining a reservoir for receiving water. Water bowl 150 has at least one, and preferably a plurality of weep-hole members 155 disposed therein. Additionally, water bowl 150 includes a centrally disposed hole member 105 adapted to receive at least the upper portion of the inverted funnel member 90 allowing the water bowl 150 to be carried by, or supported by, inverted funnel member 90. Further, in the preferred embodiment, a water tray 110, defining a diffuser, having at least one, and preferably a plurality of weep-hole members 120 disposed therein and a centrally disposed hole member 125 adapted to receive at least the upper portion of the inverted funnel member 90 allowing the water tray 110 to be carried by, or supported by, inverted funnel member 90.

Figure 5:
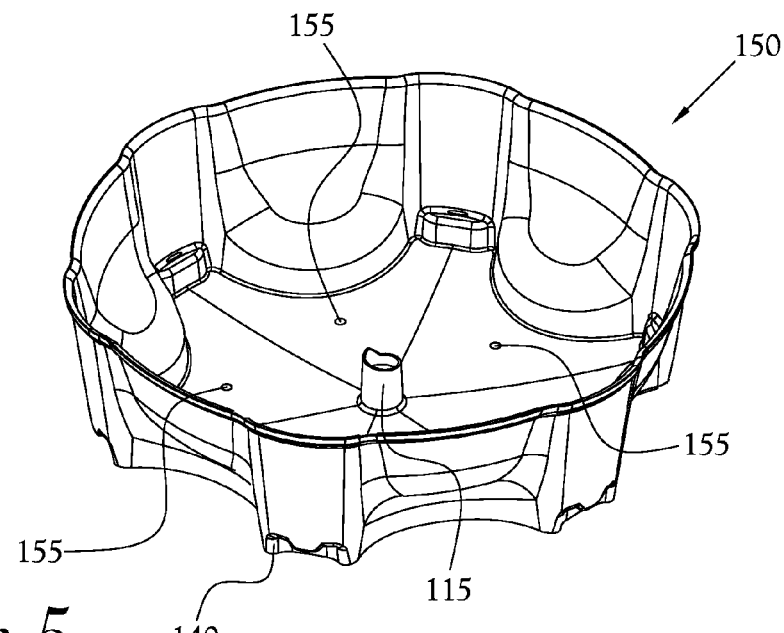
FIG. 5 is a perspective view of the water bowl of the plant tower illustrated in FIG. 1.
Figure 6:
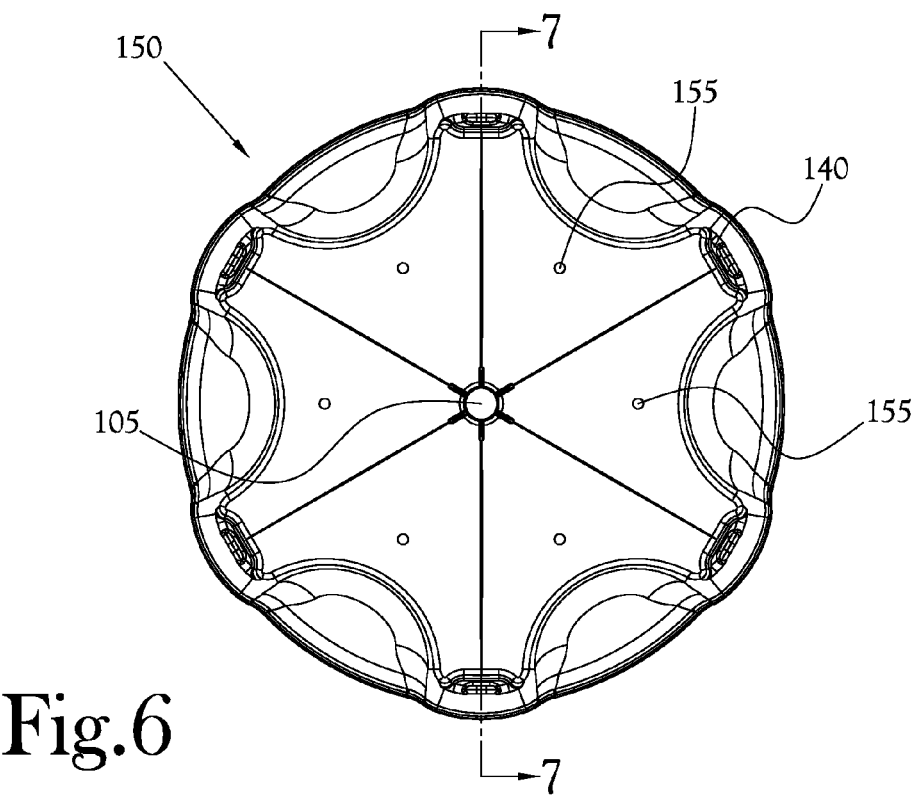
FIG. 6 is a bottom plan view of the water bow of the plant tower illustrated in FIG. 1.
Figure 7:
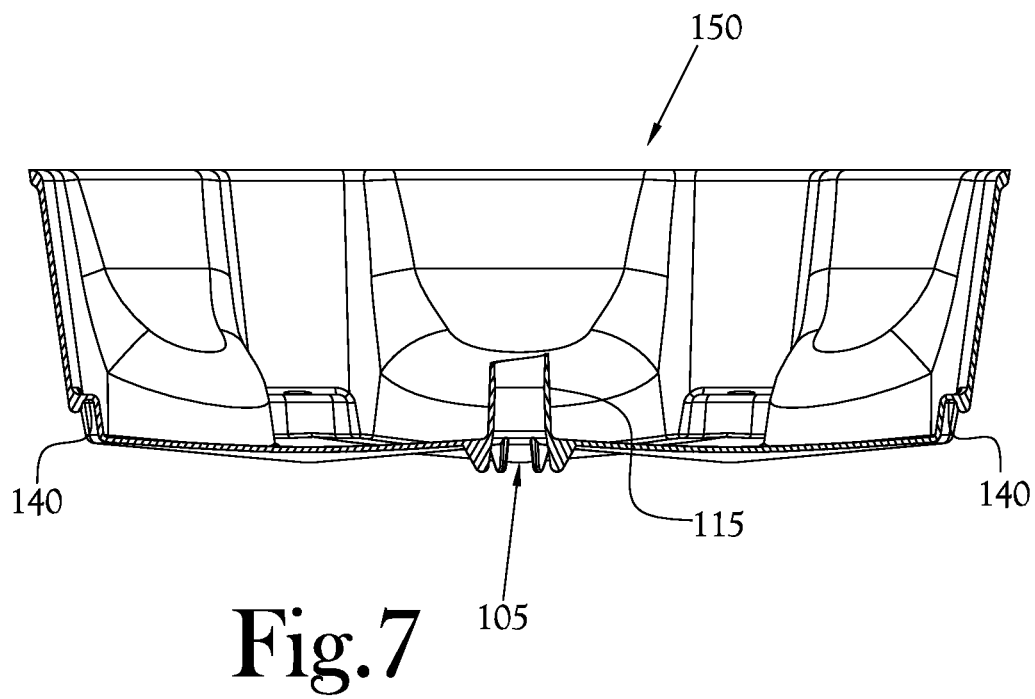
FIG. 7 is a cross-section view, taken at cut-line 7 in FIG. 6, of the water bowl illustrated in FIG. 6.
Figure 8:
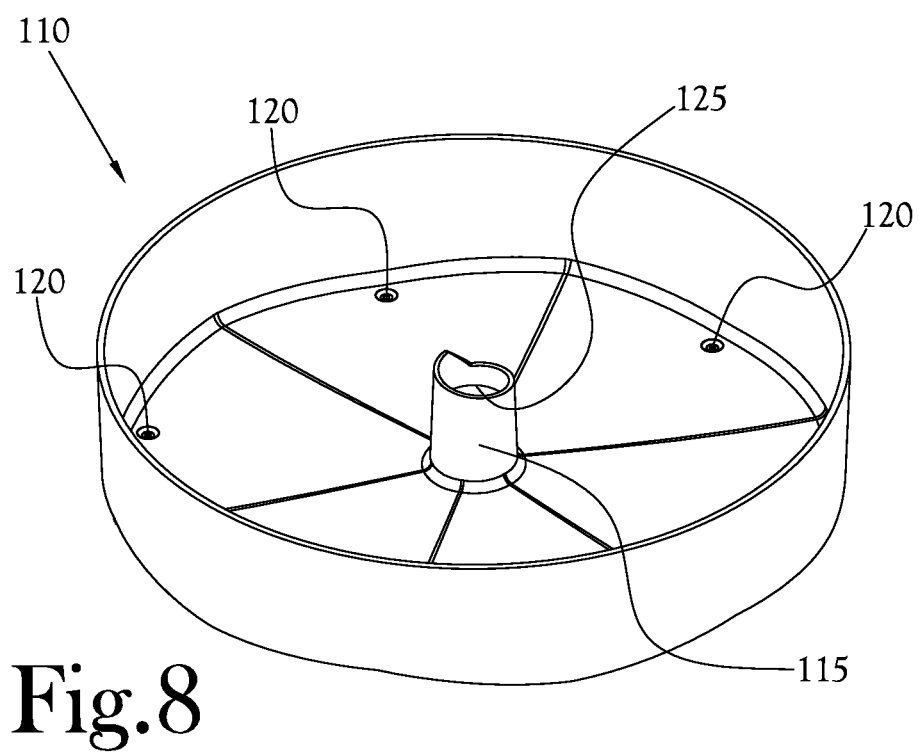
FIG. 8 is a perspective view of the water tray of the plant tower illustrated in FIG. 1.
Figure 9:
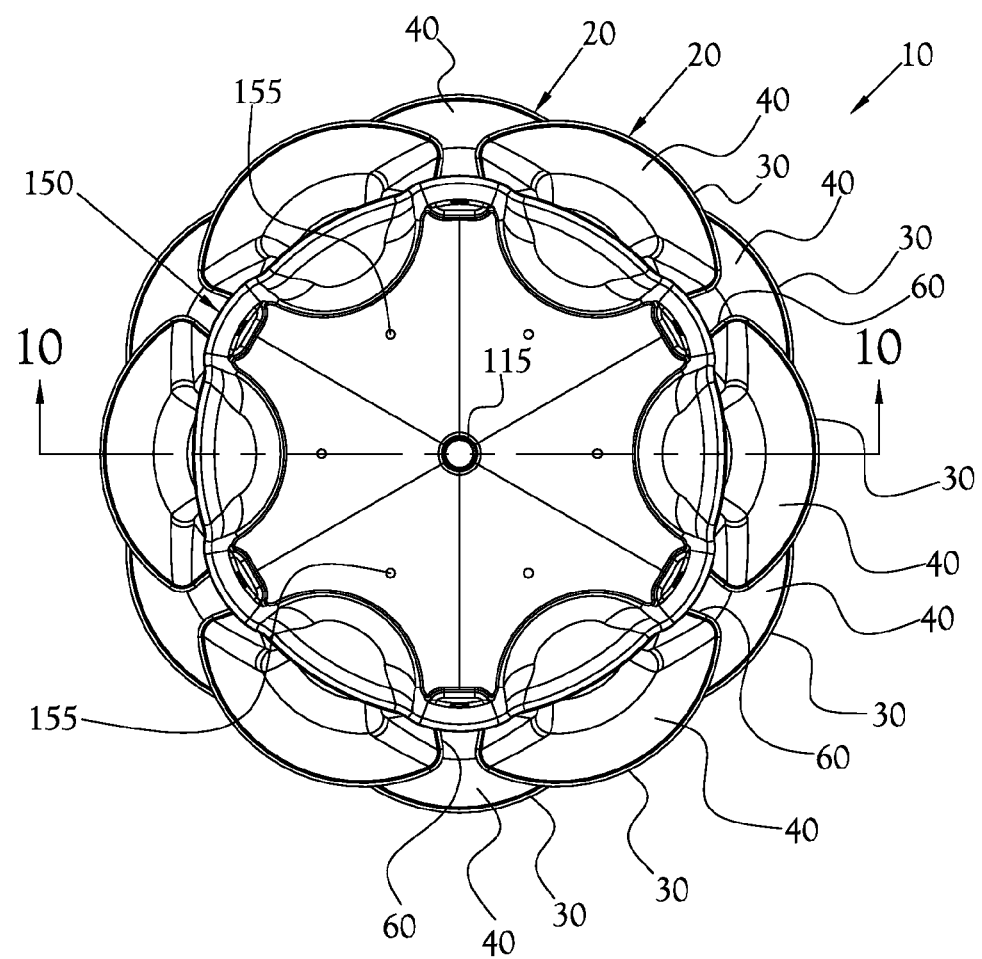
FIG. 9 is a top plan view of the stacked plant tower illustrated in FIG. 1.
Figure 10:
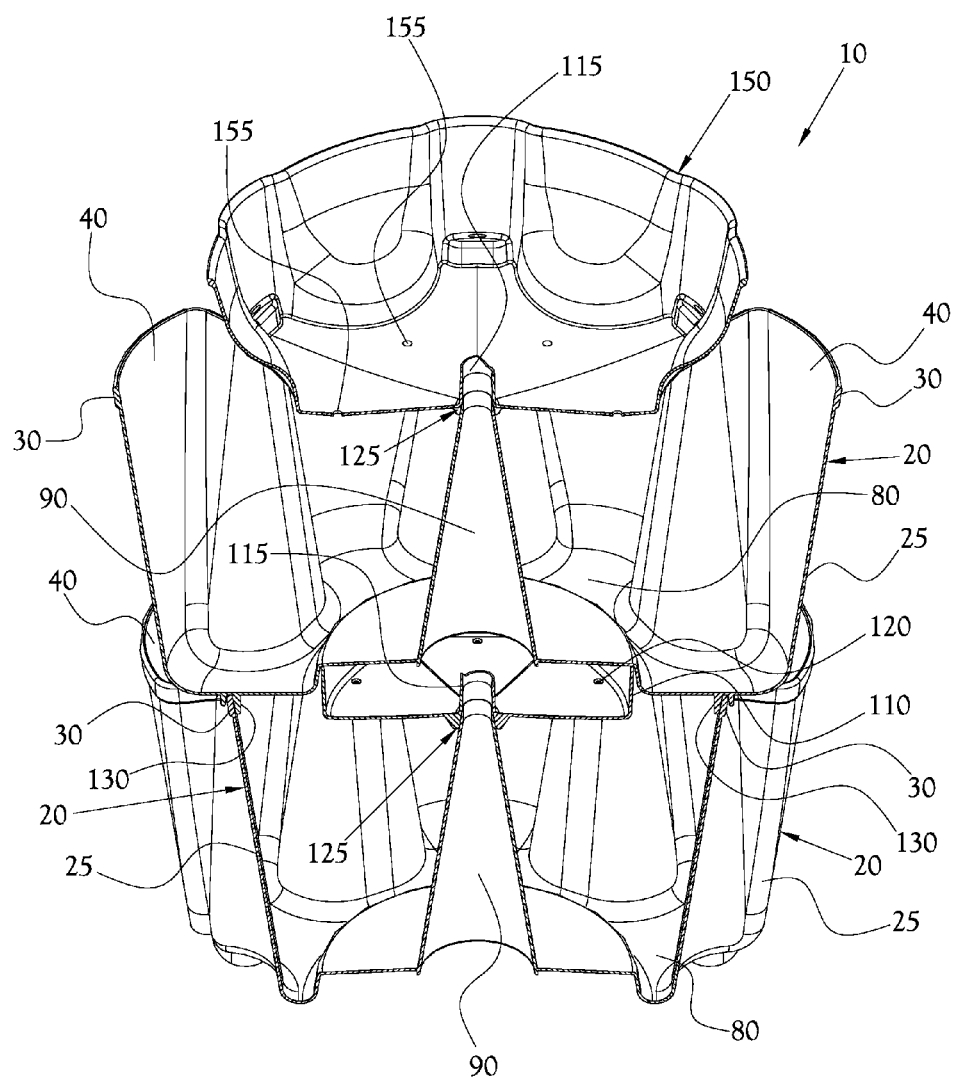
FIG. 10 is a perspective view in cross-section, taken at cut-line 10 in FIG. 9, of two stacked plant container modules of the present invention.

Further, a funnel extension member 115 is provided which is in register with centrally disposed hole member 105 and which extends into the interior volume of water bowl 150. Additional funnel extension members 115 are provided which extend into the interior volume of the water trays 110 and which are in register with centrally disposed hole members 125. In this regard, in the preferred embodiment, as illustrated in FIG. 5 and FIG. 8, a funnel extension member 115 is molded into the bottom of the water bowl 150 and into the bottom of the water trays 110. However, it will be recognized that funnel extension member 115 could be integral with the inverted funnel member 90. Further, in the preferred embodiment the upper end of funnel extension member 115 is irregularly shaped to substantially prevent a vapor lock at the top of funnel member 90 thereby facilitating the flow of water into the inverted funnel member 90.

As stated above, plant container modules 20 are adapted to be stacked one upon another. Accordingly, plant tower 10 includes connectors for securing the stacked plant container modules 20 to one another. In this regard, in the preferred embodiment, as seen more clearly in FIG. 3 and FIG. 10, the plant container modules 20 are provided with a plurality of foot members 130 disposed on the exterior surface of bottom wall member 80, preferably such that a foot member 130 is disposed proximate a lobe 40. Each foot member 130 has a groove member 135 disposed therein. Each foot member 130 is positioned such that when two plant container modules 20 are stacked one upon the other, the groove members 135 disposed in each foot member 130 will receive a portion of the rim 30 proximate an indentation 60. Further, groove members 135 are dimensioned and adapted to receive rim 30 in a tight frictional fit thereby releasably securing the stacked plant container modules 20 to one another. In the preferred embodiment, water bowl 150 is also provided with similar groove members 140 for securing water bowl 150 to the upper most plant container module 20.

In an alternate embodiment, illustrated in FIG. 12, stackable plant tower 10' is illustrated in which plant container modules 20' have flute shaped lobes 40' and broad indentations 60'. FIG. 12 also illustrates an alternate configuration for adjoining stacked plant container modules 20'. In this regard, plant container modules 20' also include a locking tab 170 carried by at least one indentation 60'. Bottom wall member 80' includes a slot member 190 disposed proximate the bottom of at least one lobe 40'. In this manner locking tab 170 is received by a slot member 190 on an adjoining container module 20' in order to secure the two container modules 20' to each other. Those skilled in the art will appreciate that, preferably, each indentation 60' carries a locking tab 170 and each lobe 40' has an associated slot member 190 in close proximity thereto.

Figure 11:
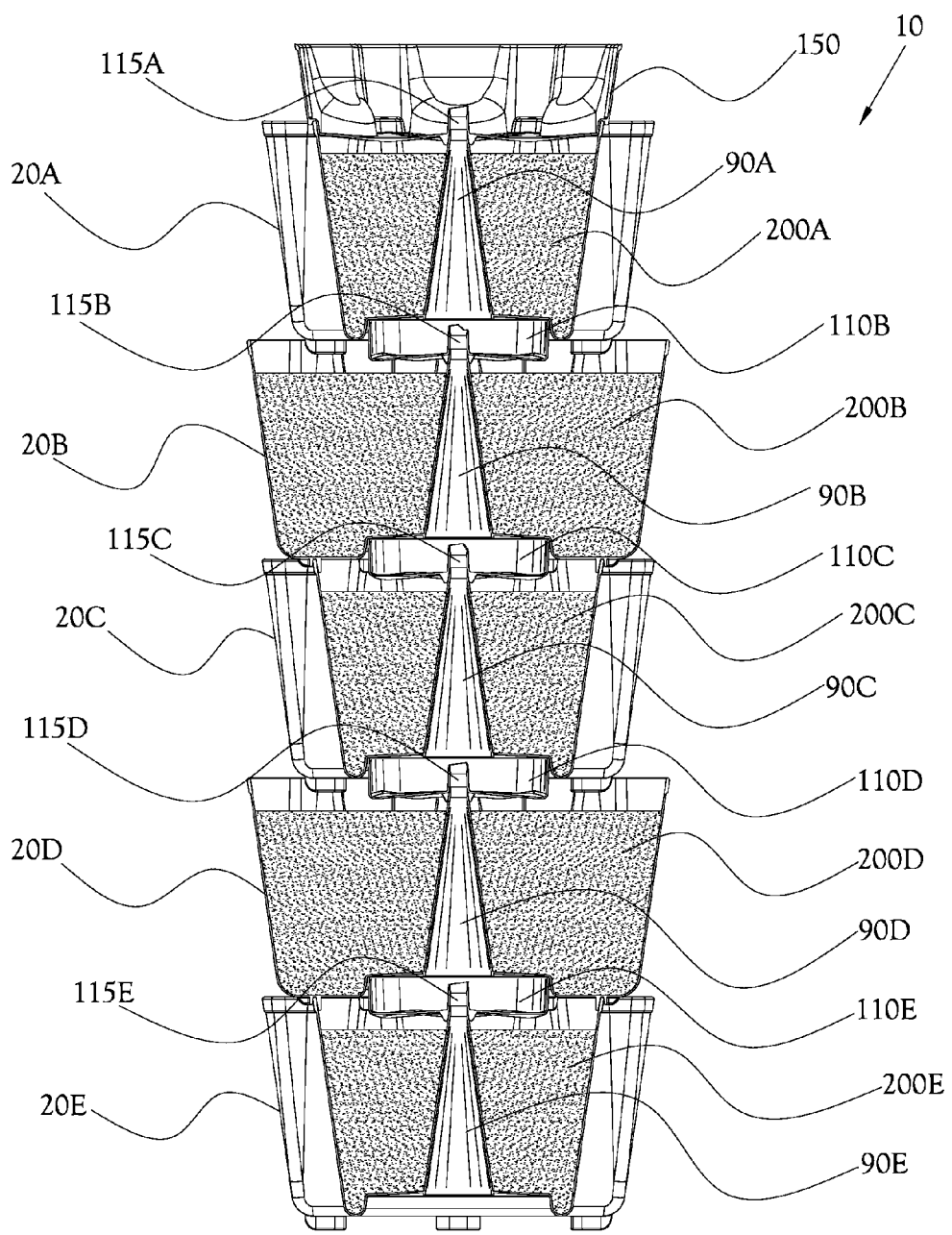
FIG. 11 is a cross-section view, taken at cut-line 10 in FIG. 9, of the plant tower illustrated in FIG. 1, with the wire cage members being removed for clarity of view, with planting medium illustrated therein for purpose of showing the flow of water through the stacked plant tower.
Figure 12:
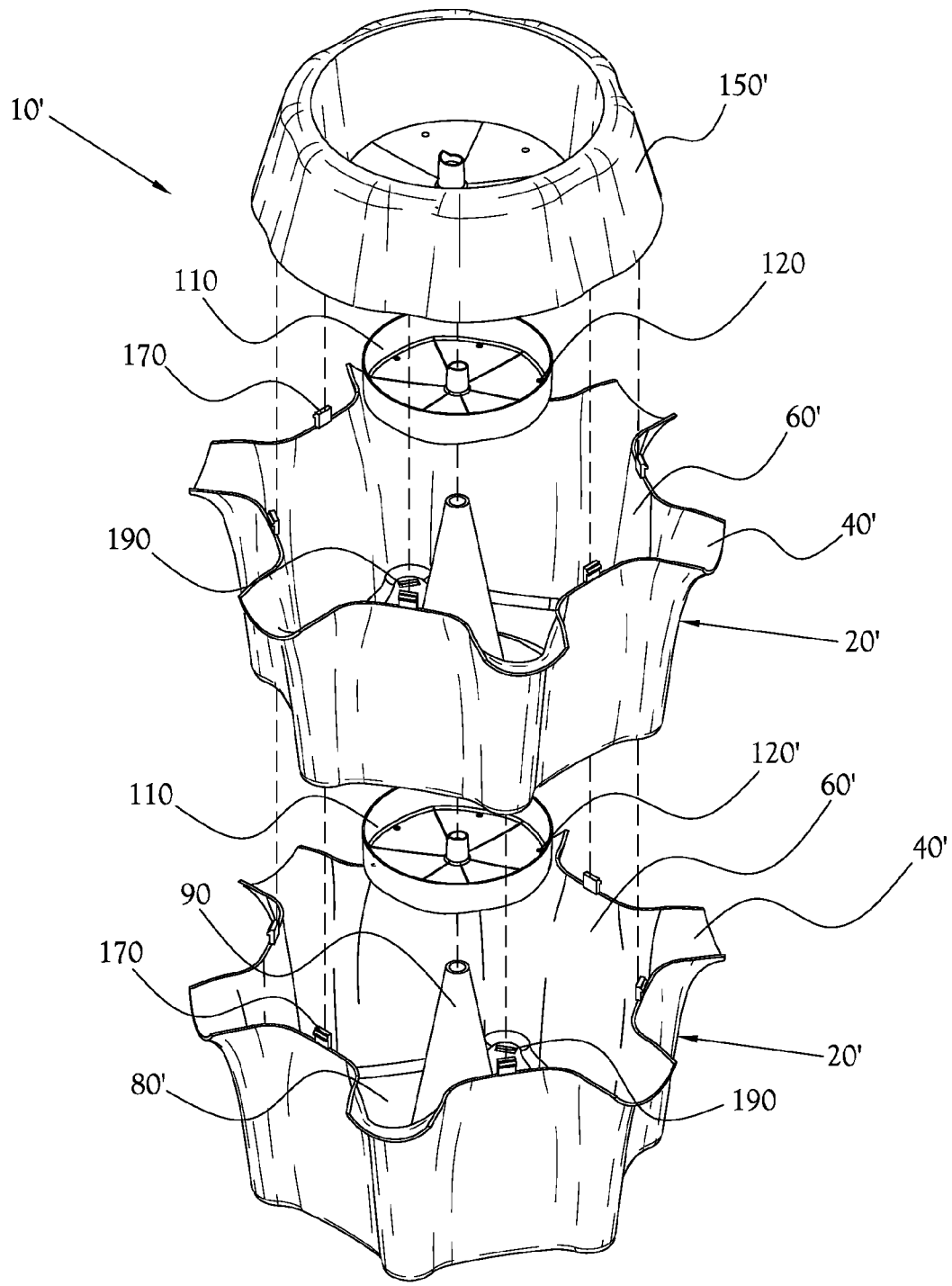
FIG. 12 is an exploded perspective view of an alternate embodiment stackable plant tower illustrating an alternate shape for the plant container module and an alternate means for securing stacked plant container modules to one another.

When a plurality of plant container modules 20 are stacked in a vertical array, see for instance FIG. 11, and the water bowl 150 is attached to the upper most plant container module 20, the water bowl 150 is in fluid communication with each water tray 110 carried by the inverted funnel member 90 of each plant container module 20. And, further, the water tray 110 and funnel member 90 of a given plant container module 20 are in fluid communication with the water tray 110 and funnel member 90 of the adjoining plant container module 20, as most clearly illustrated in FIG. 11. In this manner, as water bowl 150 receives water, either rain water or water being poured therein, water bowl 150 begins to fill and a portion of water drips through the weep-hole members 155 disposed in the bottom of the water bowl 150 into soil medium 200A contained in plant container module 20A. As the level of water in the water bowl 150 rises above the top of funnel extension member 115A, water begins flowing into the inverted funnel member 90A. Inverted funnel member 90A directs the flow of water into water tray 110B.

As water tray 110B begins to fill, a portion of water drips through the weep-hole members 120 disposed in the bottom of the water tray 110B into soil medium 200B contained in plant container module 20B. As the level of water in the water tray 110B rises above the top of funnel extension member 115B, water begins flowing into the inverted funnel member 90B. Inverted funnel member 90B directs the flow of water into water tray 110C. As water tray 110C begins to fill, a portion of water drips through the weep-hole members 120 disposed in the bottom of the water tray 110C into soil medium 200C contained in plant container module 20C. As the level of water in the water tray 110C rises above the top of funnel extension member 115C, water begins flowing into the inverted funnel member 90C. Inverted funnel member 90C directs the flow of water into water tray 110D. Similarly, as water tray 110D begins to fill, a portion of water drips through the weep-hole members 120 disposed in the bottom of the water tray 110D into soil medium 200D contained in plant container module 20D. As the level of water in the water tray 110D rises above the top of funnel extension member 115D, water begins flowing into the inverted funnel member 90D. Inverted funnel member 90D directs the flow of water into water tray 110E. And finally, in the illustrated example of a stacked plant tower 10 incorporating five separate plant container modules 20, as water tray 110E begins to fill, a portion of water drips through the weep-hole members 120 disposed in the bottom of the water tray 110E into soil medium 200E contained in plant container module 20E. If the level of water in the water tray 110E rises above the top of funnel extension member 115E, water begins flowing into the inverted funnel member 90E.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A stackable plant tower assembly adapted to manage flow of water through said stackable plant tower assembly, said stackable plant tower assembly comprising;
   a first plant container module, said first plant container module having an open top, a bottom floor member, and an upwardly projecting wall member, said upwardly projecting wall member having an upper rim and further having at least two indentations and at least two cooperating lobes defined therein, wherein said bottom wall member carries an inverted funnel member and said bottom wall member has drainage holes, further wherein said first plant container module includes a plurality of foot members carried by an exterior surface of said bottom wall member;
   at least a second plant container module adapted to be nested below said first plant container module, said first plant container module having an open top, a bottom floor member, and an upwardly projecting wall member, said upwardly projecting wall member having an upper rim and further having at least two indentations and at least two cooperating lobes defined therein, wherein said bottom wall member carries an inverted funnel member, and further wherein said first plant container module and said second plant container module are adapted to be stacked one upon another;
   a water bowl member adapted to receive a volume of water, said water bowl member having a plurality of weep-hole members disposed therein, said water bowl member further including a hole member disposed therein adapted for receiving an upper end of said inverted funnel member of said first plant container module; and
   a water tray member adapted to be carried by said inverted funnel member of said second plant container module below the water bowl whereby said water bowl member directs at least some water directly through the funnel member of the second plant container module to said water tray member through the hole member separately from the weep-hole members of the water bowl and the drainage holes of the first plant container module.

2. The stackable plant tower assembly of claim 1 wherein said second plant container modules further include a plurality of foot members carried by an exterior surface of said bottom wall member.

3. The stackable plant tower assembly of claim 2 wherein each of the foot members of the first and second plant container modules includes a groove member adapted for receiving a portion of said upper rim of said upwardly projecting wall member of said first and second plant container modules in a tight frictional fit, whereby said first and second plant container modules can be stacked together and secured one to another.

4. The stackable plant tower assembly of claim 1 wherein each of said indentations carries a locking tab and further wherein a slot member is disposed in said bottom wall member proximate each of said lobes for securing said first said plant container module to said second plant container module when said first said plant container module is stacked upon said second plant container module.

5. The stackable plant tower assembly of claim 1 wherein said plant tower assembly further comprises a funnel extension member extending into an interior volume of said water bowl member from the first plant container module.

6. The stackable plant tower assembly of claim 1 wherein said lobes have a rounded shape.

7. The stackable plant tower assembly of claim 1 wherein said lobes have an angular shape.

8. The stackable plant tower assembly of claim 1 wherein said lobes are broader than said indentations.

9. A stackable plant tower assembly adapted to manage flow of water through said stackable plant tower assembly, said stackable plant tower assembly comprising
   a first plant container module, said first plant container module having an open top, a bottom floor member, and an upwardly projecting wall member, said upwardly projecting wall member having an upper rim and further having at least two indentations and at least two cooperating lobes defined therein, wherein said bottom wall member has drainage holes and carries an inverted funnel member, further wherein said first plant container module includes a plurality of foot members carried by an exterior surface of said bottom wall member;
   at least a second plant container module nested below said first plant container module, said second plant container having an open top, a bottom floor member, and an upwardly projecting wall member, said upwardly projecting wall member having an upper rim and further having at least two indentations and at least two cooperating lobes defined therein, wherein said bottom wall member supports an inverted funnel extension member;
   a water bowl member adapted to receive a volume of water, said water bowl member having a plurality of weep-hole members disposed therein, said water bowl member further including a hole member disposed therein receiving an upper end of said inverted funnel member of the first plant container module;
   a water tray member carried by said funnel member of said second plant container module whereby said water bowl member is in fluid communication with said water tray member through the hole member; and
   the funnel extension member of the first plant container module extending into an interior volume of said water bowl member and a the inverted funnel extension member of the second plant container module extending into an interior volume of said water tray member such that when said first plant container module is stacked on top of said second plant container module, said water bowl member is carried by said upper end of said funnel member of said first plant container module and said water tray member is carried by said upper end of said funnel extension member of said second plant container module such that said water bowl member directs at least some water directly through the funnel member of the first plant container module to said water tray member through the hole member, separately from the weep-hole members of the water bowl member and the drainage holes of the first plant module.

10. The stackable plant tower assembly of claim 9 wherein said second plant container modules further include a plurality of foot members carried by an exterior surface of said bottom wall member, each of the foot members including a groove member adapted for receiving a portion of said upper rim of said upwardly projecting wall member of said plant container module in a tight frictional fit, whereby said plant container modules can be stacked together and secured one to another.

11. The stackable plant tower assembly of claim 9 wherein each of said indentations carries a locking tab and further wherein a slot member is disposed in said bottom wall member proximate each of said lobes for securing said first plant container module to said second plant container module when said first plant container module module is stacked upon said second plant container module.

12. The stackable plant tower assembly of claim 9 wherein said lobes have a rounded shape.

13. The stackable plant tower assembly of claim 9 wherein said lobes have an angular shape.

14. The stackable plant tower assembly of claim 9 wherein said lobes are broader than said indentations.

\* \* \* \* \*